United States Patent Office 3,634,472
Patented Jan. 11, 1972

3,634,472
POLYMERIC ESTERS
Peter Miles, Moston, Manchester, England, assignor to Ciba-Geigy AG, Basel, Switzerland
No Drawing. Filed Aug. 1, 1968, Ser. No. 749,304
Claims priority, application Great Britain, Aug. 19, 1967, 38,309/67
Int. Cl. C07c 69/32, 69/62, 69/78
U.S. Cl. 260—410.6    5 Claims

ABSTRACT OF THE DISCLOSURE

New polymeric esters of the formula

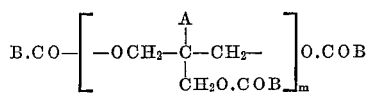

wherein A is an alkyl group having from 1 to 6 carbon atoms, $m$ is a number of at least approximately 3 and B.CO— represents the acyl radical of certain organic mono-carboxylic acids are described as useful lubricants and/or viscosity improvers. Lubricant compositions containing such polymeric esters as essential lubricant component are also disclosed.

---

The present invention relates to new polymers and in particular to new esters derived from polymers of oxetanes; it also relates to new lubricant compositions containing such polymeric esters as essential lubricant.

In British Patent No. 723,777, there is described the polymerisation of oxyacyclobutanes of formula:

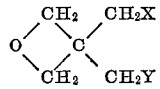

wherein X and Y are halogen, cyanide, hydroxyl, alkoxy, aroxy or acyloxy, or may be joined together to form a ring with oxygen as the heterocyclic element. The polymers so produced are described as varying in properties, according to the substituents X and Y, from highly crystalline polymers to hard, clear resins.

Moreover, British Patent 969,042 discloses the transesterification of hydroxy-oxetanes of formula:

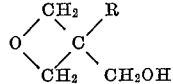

wherein R is an alkyl group preferably a methyl or ethyl group with esters of formula:

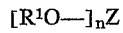

wherein $R^1$ is a hydrocarbon residue preferably a $C_1$ to $C_4$ alkyl group; Z is the residue of an organic acid originally having $n$ carboxyl groups but free from epoxide groups or other functional groups; and $n$ is 2, 3 or 4. The esters so produced have formula:

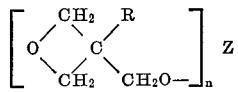

wherein R, Z and $n$ are as defined above, and after crosslinking with dicarboxylic acids give hardenable resins.

We have found that polymerisation of carboxylic acid esters of the hydroxy-oxetane of formula:

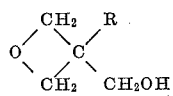

wherein R is as hereinbefore defined, to give polymers of high molecular weight could not be effected by the methods described in British Patent 723,777, that is by contacting the monomer with a Friedel-Crafts catalyst in the absence of water. When attempts were made to carry out this polymerisation reaction, although some low molecular weight polymers were obtained, none of the desired high molecular weight polyesters was produced.

However, the desired high molecular weight polyesters were obtained by first polymerising the hydroxy-oxetane and, in a second stage, esterifying the oxetane polymer with a carboxylic acid or carboxylic acid chloride. In this way, there were obtained most surprisingly, viscous liquids having outstanding viscosity/temperature properties.

According to the present invention, there is provided a compound having the formula

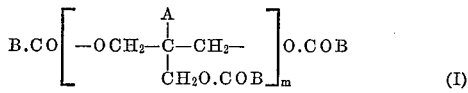

wherein A is an alkyl group having from 1 to 6 carbon atoms, $m$ is a number and is at least 3, and B is an alkyl group having from 1 to 20 carbon atoms, a halogeno alkyl group of preferably not more than 3 carbon atoms, or an aryl group, said aryl group being preferably a phenyl or naphthyl group which is unsubstituted or substituted with one or more alkyl, halogen, alkoxy or alkoxy-carbonyl groups. Preferably, however, B is an alkyl group having from 1 to 12 carbon atoms. Preferred halogen substituents are chlorine atoms; alkyl, alkoxy and alkoxy carbonyl groups as aryl substituents have preferably not more than 4 carbon atoms.

The present invention further provides a process of producing a compound of Formula I which comprises contacting a hydroxylated polymer having the formula

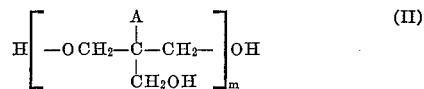

wherein A is an alkyl group having from 1 to 6 carbon atoms and $m$ is an integer and is at least 3, with a monocarboxylic acid of formula $$BCO_2H \qquad (III)$$

or the corresponding acid anhydride, or a monocarboxylic acid chloride of formula $$BCOCl \qquad (IV)$$

wherein B is a hereinbefore defined.

It is preferred that the hydroxylated polymer of Formula II is contacted with the compound of Formula III or IV until substantially complete esterification of the polymeric compound has been achieved.

If a monocarboxylic acid of Formula III is employed in the esterification process, it is advantageous to use an excess amount of acid, for instance an excess amount of up to 20% by weight over the stoichiometric proportions required, in order to ensure substantially complete esterification of the hydroxylated polymer.

Although it is preferred to effect the esterification of the polymeric compound of Formula II without the use of a catalyst, a catalyst such as p-toluene sulphonic acid may, if desired, be employed.

The esterification reaction of the present invention using a monocarboxylic acid may conveniently be carried out by heating the hydroxylated polymer of Formula II and the monocarboxylic acid under reflux conditions while continuously removing water formed during the reaction. An advantageous means of removing water formed during the reaction is to employ a solvent in the reaction such as benzene or toluene, but preferably xylene, which solvent forms an azeotropic mixture with water. When all or substantially all of the water formed during the reaction has been removed from the reaction mixture, the compound of Formula I may be isolated, for instance, by filtering the mixture, washing with water and alkali and finally removing any solvent or excess acid by distillation, preferably under reduced pressure.

Particularly suitable monocarboxylic acids or the corresponding anhydrides for use in the esterification process of the present invention are, for instance, acetic anhydride, propionic acid, n-butyric acid, isobutyric acid, n-pentanoic acid, n-hexanoic acid, 2-ethylbutyric acid, n-heptanoic, caprylic acid, 2-ethylhexanoic acid, pelargonic acid, n-decanoic acid, $\alpha,\beta$-dibromo-butyric acid, $\alpha,\beta$-dibromo-propionic acid, $\alpha,\beta$-dibromo-isobutyric acid, benzoic acid, p-chlorobenzoic acid, o-, n- and p-toluic acid, anisic acid, mono-methyl-phthalate and naphthoic acid.

If a monocarboxylic acid chloride of Formula IV is used in the esterification process of the present invention, a smaller excess of the acid chloride, for instance up to 10% by weight over the stoichiometric proportion required, may be used to achieve complete esterification. In this case, however, it is advantageous to have present in the reaction mixture an acid-binding agent, for instance pyridine, in order to remove hydrogen chloride as it is formed during the reaction.

The esterification reaction of the present invention using an acid chloride may conveniently be effected by slowly adding the acid chloride to the hydroxylated polymer of Formula II at an elevated temperature for instance at a temperature within the range of from 50° C. to 100° C. After completion of the addition of the acid chloride, the esterification may be completed by heating the reaction mixture under reflux conditions for a period of, for instance, up to ten hours. The compound of Formula I may be isolated, for example, by removing the acid-binding agent in the form of the hydrochloride salt by filtration, extracting the reaction mixture with a suitable solvent such as ether, chloroform or benzene, washing the solvent extract free from acid, drying the solvent extract and finally removing the solvent by distillation.

Particularly suitable monocarboxylic acid chlorides for use in the esterification process of the present invention are, for example, acetyl chloride, propionyl chloride, n-butyryl chloride, isobutyryl chloride, n-pentanoyl chloride, n-hexanoyl chloride, 2-ethybutanoyl chloride, n-heptanoyl, chloride, capryloyl chloride, 2-ethylhexanoyl chloride, pelargonyl chloride, n-decanoyl chloride, benzoyl chloride and toluoyl chloride.

The viscosity properties of the compound of Formula I may be modified as desired by varying the following criteria:

(a) The conditions of the polymerisation process of this invention so as to alter the degree of polymerisation achieved; thus increased content of monomer in a suitable solution thereof leads to higher degrees of polymerisation;

(b) The nature of the monomer starting-material; with A in the monomer increasing in chain length, the degree of polymerisation decreases;

(c) The nature of the acid or acid chloride starting-material; the longer the chain in aliphatic acyl radicals, the higher the viscosity of the resulting ester of Formula I; branched-chain acids affords esters of higher viscosity than the corresponding straight-chain esters;

(d) The conditions of the esterification process of this invention by which the extent of esterification can be determined; fully esterified products are preferred.

The hydroxylated polymer of Formula II may be conveniently produced, for example, by contacting an oxetane of Formula V:

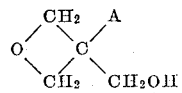

V wherein A is as hereinbefore defined, with a Friedel-Crafts catalyst.

The process of producing a compound of Formula II may be conveniently effected by adding the Friedel-Crafts catalyst to the monomer at a temperature below 20° C. with stirring. When all the monomer has been contacted with the catalyst, the mixture may be stirred until polymerisation is complete, as indicated, for instance, by the termination of the exothermic effect due to the heat of polymerisation. No purification of the polymer product is usually necessary, but, if desired, the polymer product may be filtered or washed free from catalyst. If a solvent is employed in the polymerisation process, it may be removed, for example, by fractional distillation.

The process of producing a compound of Formula II according to this invention is preferably effected by contacting an oxetane of Formula V with a Friedel-Crafts catalyst in the presence of a trace of water as co-catalyst. It is not usually necessary to deliberately add water to the Friedel-Crafts catalyst or the monomer since, unless stringent precautions are taken, these entities will normally contain water inherently in a sufficient proportion to ensure smooth polymerisation. Suitable Friedel-Crafts catalysts for use in the polymerisation process include, for instance, phosphorus pentafluoride, aluminium trichloride, aluminium trialkyls such as aluminium triethyl, or stannic chloride. Preferably, however, boron trifluoride or a complex of boron trifluoride with, for example, water, diethyl ether or acetic acid is used as the reaction catalyst.

The polymerisation process is exothermic and, in order to control the degree of polymerisation, it is desirable to control the reaction temperature by externally cooling the reactor in which the polymerisation is effected.

While the polymerisation process may be carried out within a wide range of temperature, for instance within the range of from −50° C. to +100° C., it is preferred to effect the polymerisation at a temperature within the range of from −40° C. to +20° C.

Preferably no extraneous solvent is employed in the polymerisation process since, in this way, products of the maximal molecular weight in the maximal yield are obtained. If however, a product of low or intermediate molecular weight is required, an inert solvent in which the monomer is soluble but the desired polymer is substantially insoluble may be employed. By the use of such a solvent the polymer is thrown out of solution once the desired degree of polymerisation has been reached. For the production of polymers of intermediate molecular weight, suitable reaction solvents are, for example, methylene chloride, diethyl ether, benzene and toluene.

Desirably, at the end of the polymerisation process the catalyst is removed from the reaction product by washing with a polar solvent, for instance, water or ethanol.

The oxetane starting-material of Formula V may, in turn, be prepared for instance, according to the procedure described by Pattison, Journal of the American Chemical Society, volume 79, p. 3455 (1957).

Preferred oxetanes of Formula V for use in the polymerisation process are 3-methyl-3-hydroxymethyl-1-oxacyclobutane, 3-ethyl-3 - hydroxymethyl - 1-oxacyclobutane and 3-n-amyl-3-hydroxymethyl-1-oxacyclobutane.

Instead of using a single oxetane monomer of Formula V in the polymerisation process, two or more different monomers of Formula V may, if desired, be employed to produce a linear copolymer having the Formula II but wherein A represents two or more different alkyl groups.

By a suitable choice of starting-material and/or process conditions, ester products of Formula I may be achieved having a wide range of viscosities. Thus, for instance, ester products can be produced, especially when using aliphatic acids or acid chlorides of medium carbon number (about $C_5$ to $C_{10}$, and preferably $C_6$ to $C_8$), the viscosity of which is in the range of from about 30 to 150 centistokes (at 210° F.) and which are useful as lubricants in calender mills and the like.

Lubricant compositions containing a polymeric ester falling under Formula I or a mixture of such esters as the essential lubricant component may be obtained by adding to such ester or ester mixture adjuvants conventional in lubricants, for instance, antioxidants, in order to hinder the autoxidation which occurs at higher temperatures. The content of antioxidants for this purpose is about 0.01 to 5% of the total weight of ester according to the invention.

Homocyclic or heterocyclic aromatic amines, hydroxy-substituted aromates, aminohydroxyaryl compounds as well as certain heterocyclic compounds are suitable as such antioxidants.

Of the amines, in general the secondary monoamines, in particular the diarylamines having homo- and heterocyclic aromatic radicals as well as the aromatic diamines the amine substituents of which, which are preferably secondary, are in the o- or advantageously the p-positions, are particularly valuable.

Examples of antioxidants from the class of homo- and hetero-cyclic aromatic diarylamines are diphenylamines, phenylnaphthylamines, phenylacenaphthenyl-amines; 4,4' - dinaphthylaminodiphenyl; thiazolyl-(2)-naphthylamines; examples of aromatic diamines are N, N'-diphenyl-p-phenylenediamine, N,N'-dioctyl-p-phenylenediamine, N,N'-dicyclohexyl-p-phenylenediamine, N-sec.-butyl-N'-phenyl-p - phenylenediamine, N,N'-bis-(γ-aminopropyl)-p-phenylenediamine.

Of the antioxidants from the class of hydroxyl-substituted aromates which can be employed in particular at general working temperatures which are not excessively high, those having a sterically hindered hydroxyl group as well as the derivatives of dihydroxyaryl compounds the hydroxyl groups of which are in the o- or p-position to each other are suitable. Particularly valuable examples of compounds which can be used are the monophenol derivatives such as 2,4-dimethyl-6-tert. butyl phenol,
2,6-di-tert. butyl-4-ethylphenol,
2,6-bis-(1'-methylcyclohexyl)-4-methylphenol,
2,6-di-tert. butyl-4-dimethylamino-methylphenol,
2,2'-methylene-bis-(4-methyl-6-tert. butylphenol),
2,2'-thio-bis-(4-methyl-6-tert. butylphenol),
4,4'-dihydroxy-2,2'-dimethyl-5,5' - di-tert. butyl-diphenyl sulphide and diphenyl disulphide,
2,6-bis-(2'-hydroxy-3'-tert. butyl-5'-methylbenzyl)-4-methylphenol;

derivatives of poly-nuclear phenols such as 2-tert. butyl-1-hydroxynaphthalene, 4,6-di-tert. butyl-5-hydroxyindane, 5-hydroxyacenaphthene; polyvalent phenols and their derivatives: butylpyrocatechine, octyl gallate, hydroquinone, butylhydroxy anisole, hydroquinone monobenzylether.

Of the aminohydroxyaryl compounds, those derivatives having the amino and hydroxyl groups in p-position to each other are particularly suitable as antioxidants. Examples are: p-hydroxydiphenylamine, p-hydroxyoctylaniline, p-hydroxy-N,γ-aminopropylaniline.

Of the heterocyclic antioxidants, the cyclic imides are the best known; in addition however, heterocyclic compounds containing no nitrogen can be employed provided they are not within the class of heterocyclic amines. Examples are: phenothiazine, iminodibenzyl, 5-ethyl-10,10-diphenyl-phenosilazine, 6-methoxy- or 6-ethoxy- or 6-ethylamino- 2,2,4-trimethyl-1,2-dihydroxyquinoline or the telomers thereof, 3 - hydroxy-7,8-benzo-1,2,3,4-tetra-hydroquinoline or tocopherol.

In addition, the polymeric ester-based lubricant compositions according to the invention can contain high pressure additives such as phosphites, phosphates, sulfonates; anticorrosives such as sarcosines or benzotriazoles; agents lowering the solidification point, and, optionally, also anti-foaming agents based on silicone.

Also the invention includes lubricating greases produced from the polymeric esters according to the invention by the addition of the usual thickeners. Examples of such thickeners are metal soaps, bentonite, phthalocyanines, violanthrones, indanthrenes, flavanthrenes, pyranthrones, isatines and indigo. The aforementioned esters falling under Formula I, and especially those obtained from acids having about 5 to 10 carbon atoms are distinguished by ASTM slopes in the range of from about 0.440 to 0.550.

Alternatively, ester products of higher viscosity, for instance up to 300 centistokes (at 210° F.), are produced, for instance, by using lower aliphatic acids or acid chlorides in their production; they are suitable for use as viscosity-index improvers in functional fluids such as hydraulic fluids and synthetic lubricants. Viscosity improvers of even higher viscosity may also be produced by the process according to the invention, especially when using aromatic acids such as benzoic acid in the esterification stage.

The following examples further illustrate the present invention. In the examples, the molecular weight determinations were carried out by an osometric method, and the molecular weight of the product is expressed as number average molecular weight. Parts by weight expressed therein bear the same relation to parts by volume as do kilograms to litres.

EXAMPLE 1(A)

50 parts of 3-ethyl-3-hydroxymethyl-1-oxacyclobutane prepared according to the procedure described by Pattison, Journal of the American Chemical Society, volume 79, page 3455 (1957) were placed in a reactor fitted with a thermometer and stirring device and the contents of the reactor were cooled to —30° C. by means of external cooling using a bath of "Cardice" and acetone. One drop of boron trifluoride-diethyl etherate was added to the stirred monomer and stirring of the reaction mixture was continued at —30° C. for a further 4 hours.

In this way 50 parts of a transparent, brittle polymer were produced, having a molecular weight of 1500.

EXAMPLE 1(B)

50 parts of hydroxylated polymer produced according to Example 1(A) were dissolved in 100 parts by volume of xylene and 97.5 parts of n-heptanoic acid were added to the solution. The mixture was then heated under reflux conditions for 24 hours, the internal temperature of the reaction mixture being maintained at 140° to 160° C. throughout. At the end of this time, the theoretical amount of water formed during the reaction (7 parts by volume) had been removed as an azeotropic mixture with the xylene solvent.

The xylene solvent and the excess of acid were then removed by distillation, the latter at 200° C./0.5 millimetres of mercury pressure.

In this way, 68.5 parts of a viscous liquid were obtained having an acid value of 0.45 milligram of KOH/gram, a viscosity at 210° F. of 98.8 centistokes, an ASTM slope of 0.481 and a molecular weight of 2,000 ($m$ equals about 7.7).

EXAMPLE 2

48.6 parts of hydroxylated polymer produced as in Example 1(A) were dissolved in 100 parts by volume of xylene and 1.0 part of p-toluene sulphonic acid and 78 parts of pelargonic acid were added to the solution. The mixture was then heated at 158° C. under reflux conditions for 19 hours. At the end of this time the theoretical amount of water (6.6 parts) had been removed as an azeotropic mixture with xylene.

The solvent and excess of acid were removed from the product by distillation, the latter at 220° C./0.5 millimetres of mercury pressure.

In this way, 70 parts of a viscous liquid were obtained having an acid value of 0.44 milligram KOH/gram, a viscosity at 210° F. of 125.2 centistokes, an A.S.T.M. slope of 0.471 and a pour point of +5° F. Its average molecular weight is about 3250 ($m=11.5$).

EXAMPLE 3

61.5 parts of hydroxylated polymer produced as in Example 1(A) were dissolved in 150 parts by volume of pyridine and 101.9 parts of 2-ethylhexanoyl chloride were added to the stirred solution at 80° C. and the mixture was heated under reflux conditions for a further 5 hours. The pyridinium hydrochloride was filtered off and the filtrate was extracted with benzene (2×50 parts by volume). The benzene extract was washed with 10% brine solution until neutral. The washed extract was dried over anhydrous magnesium sulphate, filtered and the benzene solvent removed by distillation.

In this way, 110 parts of a pale-brown viscous liquid were obtained having an acid value of 0.36 milligram KOH/gram, viscosity at 210° F. of 117 centistokes, A.S.T.M. slope of 0.057 and a pour point of 0° F. Its average molecular weight is about 3100 ($m=11.7$).

EXAMPLE 4

61.5 parts of hydroxylated polymer produced as in Example 1(A) and 101.9 parts of capryloyl chloride were reacted in pyridine solvent in the manner described in Example 3.

In this way, 85 parts of a viscous liquid were obtained having an acid value of 0.64 milligram KOH/gram, a viscosity at 210° F. of 113.3 centistokes, an ASTM slope of 0.462 and a pour point of 0° F. Its molecular weight is about 3100 ($m=11.7$).

EXAMPLE 5

50 parts of hydroxylated polymer produced as in Example 1(A) and 36 parts of acetic anhydride were heated under reflux conditions at 110° C. for 5 hours. The reaction mixture was cooled and the excess of acid removed by distillation under reduced pressure.

In this way, 64 parts of a colourless, viscous liquid were obtained having the following properties:

Acid value—0.1 milligram KOH/gram
Viscosity at 210° F.—237.4 centistokes
Viscosity at 100° F.—9,400 centistokes
ASTM slope—0.554
Molecular weight—1650 ($m=9.75$)

EXAMPLE 6

50 parts of hydroxylated polymer produced as in Example 1(A) were dissolved in 100 parts by volume of pyridine. 75 parts of benzoyl chloride were added slowly with stirring to this solution at 110° C. The internal temperature of the mixture rose to 125° C. with gentle reflux during the addition. The mixture was then heated under reflux conditions for 2 hours at 125° C. On cooling, pyridinium hydrochloride separated from solution and was filtered off. Excess pyridine was removed by distillation at 100° C. under reduced pressure and the residue dissolved in 50 parts by volume of benzene. The benzene extract was then washed with water until neutral. The benzene solution was dried and purified over anhydrous magnesium sulphate and decolourising carbon. After filtering, the extract was distilled to remove the benzene solvent.

In this way, 68.7 parts of a pale brown viscous liquid were obtained having the following properties:

Acid value—0.1 milligram KOH/gram

Viscosity at 210° F.—2,280 centistokes
Molecular weight—2,300 ($m=9.43$)

EXAMPLES 7 TO 10

The polymerisation of 3-ethyl-3-hydroxymethyl-1-oxacyclobutane (50 parts by weight) was carried out in diethyl ether solvent and the initial concentration of the monomer in the solvent was varied in order to produce polymers of varying molecular weight. Four runs were carried out using monomer concentrations of 100% by weight, 50% by weight, 33% by weight and 25% by weight based on the weight of the ether solvent.

Then each of the four hydroxylated polymers produced were reacted with n-heptanoic acid according to the procedure described in Example 1(B). The product of Example 7 is of practically identical properties with that obtained from Example 1(B).

The properties of the resulting ester products are summarised in the following table:

| Example | Concentration of monomer in ether (percent) | Molecular weight of ester product ($m$) | Viscosity at 210° F. (C.S.) | Viscosity at 100° F. (C.S.) | A.S.T.M. slope | Pour-point (° F.) |
|---|---|---|---|---|---|---|
| 7 | 100 | 2,000 (7.7) | 98.8 | | 0.481 | 0 |
| 8 | 50 | 1,938 (7.45) | 87.8 | 1102.7 | 0.493 | 0 |
| 9 | 33 | 1,100 (3.76) | 36.5 | 349.9 | 0.538 | −10 |
| 10 | 25 | 900 (2.89) | 30.5 | 270.6 | 0.538 | |

These results demonstrate that esters of widely differing physical properties may be produced according to the present invention.

EXAMPLE 11

5 parts by weight of the n-heptanoate ester product of Example 1(B) were incorporated into 100 parts by weight of tri-xylyl phosphate of viscosity index—6.77 which is conventionally employed as a hydraulic fluid. The viscosity index of the composition was determined according to A.S.T.M. D567–53 and found to be +53.22.

Accordingly, it can be seen that a typical ester product of this invention has substantial viscosity-index improving properties when incorporated into a conventional hydraulic fluid. An even greater viscosity is obtained when using in this example in lieu of the ester of Example 1(B) only 1 part of the polymeric ester produced according to Example 6.

EXAMPLE 12(A)

25 parts of 3-methyl-3-hydroxymethyl-1-oxacyclobutane prepared according to the procedure described by Pattison, Journal of the American Chemical Society, volume 79, page 3455 (1957) were dissolved in 50 parts by volume of dry benzene and placed in a reactor fitted with a reflux condenser, a thermometer and a gas-inlet tube. The contents of the reactor were flushed out with nitrogen gas, cooled to 5° C., and two drops of boron trifluoride diethyl etherate were added, with stirring, to the monomer solution. The monomer solution was then allowed to stand for a period of 16 hours. At the end of this time the reaction product was a gel. The acidic catalyst was neutralised by the addition of several drops of aqueous ammonium hydroxide. The reaction mixture was then heated under reflux conditions for 5 hours after which time the benzene solvent was removed by distillation.

The polymer so produced had a molecular weight of 1700 and was soluble in methanol but not in chloroform.

EXAMPLE 12(B)

50 parts of the hydroxylated polymer produced according to Example 12(A) were dissolved in 100 parts by volume of xylene and 97.5 parts of n-heptanoic acid were added to the solution. The mixture was then heated under reflux conditions for 19 hours at 170° C., water formed during the reaction being removed continuously as an azeotropic mixture with xylene.

When all the water had been removed, the xylene solvent and the excess of acid were then removed by distillation, the latter at 200° C./0.5 millimetre of mercury pressure.

In this way, 70 parts of a viscous liquid were obtained having an acid value of 0.4 milligram of KOH/gram; a viscosity at 210° F. of 133.1 centistokes; a viscosity at 100° F. of 1,664 centistokes; a pour-point of +35° F. and an A.S.T.M. slope of 0.458.

Its average molecular weight was 3300 ($m=14.3$).

EXAMPLE 13

50 parts of the hydroxylated polymer produced according to Example 12(A) were dissolved in 100 parts by volume of xylene and 97.5 parts of pelargonic acid were added to the solution. The mixture was heated under reflux conditions for 19 hours at 180° C. after which time all the water formed during the reaction had been removed as an azeotropic mixture with xylene.

The xylene solvent and the excess pelargonic acid were removed by distillation finally at 200° C./0.5 millimetre of mercury pressure.

In this way, 65 parts of a viscous liquid were obtained having the following physical properties:

viscosity at 210° F.—185.9 centistokes
viscosity at 100° F.—2,517 centistokes
pour point—+40° F.
A.S.T.M. slope—0.446
molecular weight—ca. 3700 ($m=14$)

EXAMPLE 14(A)

1,1,1-tris-(hydroxymethyl) hexane was prepared according to the method described by B. Weibull and M. Matell in Acta Chem. Scand. 16 (1962) page 1062.

The 1,1,1-tris-(hydroxymethyl) hexane was then converted by the method described by Pattison to 3-amyl-3-hydroxymethyl-1-oxacyclobutane. In this way, 3-amyl-3-hydroxymethyl oxacyclobutane was obtained having boiling range 92° to 102° C. at 0.5 millimetre of mercury pressure, $n_D^{25}$ of 1.4449 and the following elemental analysis by weight:

Calculated (for $C_9H_{18}O_2$) (percent): carbon, 68.31; hydrogen, 11.47. Found (percent): carbon, 68.07; hydrogen, 11.33.

EXAMPLE 14(B)

50 parts of 3-amyl-3-hydroxymethyl oxacyclobutane were then polymerised in a similar manner to that described in Example 12(A).

The hydroxylated polymer so produced had a molecular weight of 2150 and was soluble in chloroform.

EXAMPLE 14(C)

50 parts of the hydroxylated polymer produced in Example 14(B) were then esterified using n-heptanoic acid under similar reaction conditions to those described in Example 12(B).

In this way, 68 parts of a viscous liquid were obtained having the following physical properties:
viscosity at 210° F.—92.4 centistokes
viscosity at 100° F.—1214 centistokes
pour point—+25° F.
A.S.T.M. slope—0.495
molecular weight—3890 ($m=13.5$)

EXAMPLE 15

3 parts of copper phthalocyanine are stirred in 25 ccm. of benzene in an "Ultraturax" mixing apparatus (Janke & Kunkel, Stauffen, Baden, Germany). 9 parts of the polymeric ester obtained according to Example 7 are slowly added to this mixture and the whole is stirred for 45 minutes. The homogeneous mass so obtained is worked on a glass surface with a spatula until the excess benzene has evaporated.

The mass obtained is heated for 45 minutes at 150° and, after cooling, is again worked with a spatula.

A good grease which can be well worked is obtained.

EXAMPLE 16

99 parts of the compound produced according to Example 1(B) and 1 part of iminodibenzyl are stirred together until the latter has completely dissolved. The lubricant composition obtained has improved stability to oxidation when compared with the pure polymeric ester.

Similar results are obtained if instead of the above compound, the other synthesised compounds mentioned in this document are used with the antioxidants described hereinbefore in amounts of 0.01 to 5%.

We claim:
1. A polymeric ester corresponding to the formula

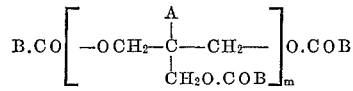

wherein A represents alkyl of from 1 to 6 carbon atoms, $m$ is a member ranging from about 3 to 15, and B is a member selected from the group consisting of alkyl of from 1 to 20 carbons, halogenoalkyl of from 1 to 3 carbons, phenyl, methylphenyl, chlorophenyl, methoxyphenyl, methoxycarbonylphenyl and naphthyl.

2. A compound as defined in claim 1, wherein B is alkyl of from 1 to 12 carbon atoms.

3. A compound as defined in claim 2, having a viscosity within the range of from 30 to 300 centistokes at 210° F.

4. A compound as defined in claim 3, wherein B.CO represents the acyl radical of an acid selected from acetic acid, propionic acid, n-butyric acid, iso-butyric acid, n-pentanoic acid, n-hexanoic acid, 2-ethylbutyric acid, n-heptanoic acid, caprylic acid, 2-ethylhexanoic acid, pelargonic acid and n-decanoic acid.

5. A compound as defined in claim 1, wherein B is phenyl or methylphenyl.

References Cited

UNITED STATES PATENTS 3,328,427  6/1967  Melaas _____ 260—469
3,459,733  8/1969  Byrd _____ 260—475

LORRAINE A. WEINBERGER, Primary Examiner

V. GARNER, Assistant Examiner

U.S. Cl. X.R.

252—50, 51.5, 56, 57; 260—2, 333, 469, 473 R, 475 P, 476 R, 487, 488 J